(12) United States Patent
Hou et al.

(10) Patent No.: US 11,536,428 B2
(45) Date of Patent: Dec. 27, 2022

(54) LIGHTING APPARATUS WITH ELASTIC UNIT TO PRESS POWER SWITCH

(71) Applicant: XIAMEN LEEDARSON LIGHTING CO., LTD, Fujian (CN)

(72) Inventors: Shouqiang Hou, Fujian (CN); Xiaoliang Wen, Fujian (CN); Qingguang Zeng, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/029,941

(22) Filed: Sep. 23, 2020

(65) Prior Publication Data

US 2021/0088193 A1 Mar. 25, 2021

(30) Foreign Application Priority Data

Sep. 23, 2019 (CN) .......................... 201921588294.9

(51) Int. Cl.
*F21S 9/02* (2006.01)
*H05B 47/16* (2020.01)
*F21V 7/00* (2006.01)
*F21V 23/06* (2006.01)
*F21V 23/04* (2006.01)
*F21Y 115/10* (2016.01)

(52) U.S. Cl.
CPC .............. *F21S 9/02* (2013.01); *F21V 7/0075* (2013.01); *F21V 7/0083* (2013.01); *F21V 23/0414* (2013.01); *F21V 23/06* (2013.01); *H05B 47/16* (2020.01); *F21Y 2115/10* (2016.08)

(58) Field of Classification Search
CPC .. F21V 23/04; F21V 23/0414; F21V 23/0428; F21L 4/02; F21S 9/02; H05B 47/16; G04G 13/023; G04G 11/00; G04B 23/03; G04V 19/00; G04V 19/02
See application file for complete search history.

(56) References Cited

U.S. PATENT DOCUMENTS

| | | | | |
|---|---|---|---|---|
| 6,588,435 B1* | 7/2003 | Gindi | ..................... | A45D 40/18 132/73 |
| 2005/0248935 A1* | 11/2005 | Strip | ................... | H01L 27/3276 362/145 |
| 2007/0236931 A1* | 10/2007 | Chien | ..................... | F21S 8/035 362/249.07 |
| 2009/0109677 A1* | 4/2009 | Coushaine | .......... | F21V 23/0414 362/267 |

(Continued)

*Primary Examiner* — Rajarshi Chakraborty
*Assistant Examiner* — Steven Y Horikoshi
(74) *Attorney, Agent, or Firm* — Chun-Ming Shih; Lanway IPR Services (57) ABSTRACT

A lighting apparatus includes a top cover, a bottom cover, a light passing cover, a battery, a power circuit, a power switch and a light source plate. The top cover has an opening part for defining a light opening. The bottom cover is fixed to the top cover forming a containing space. The light passing cover has a larger diameter than the light opening. A peripheral edge of the light passing cover engages an inner surface of the opening part of the top cover. The battery is stored in the container space. The power circuit is connected to the battery for providing a current to the LED modules of the light source plate. The power switch is connected to the power circuit to control the LED modules. The light source plate has a top side mounted with multiple LED modules.

16 Claims, 11 Drawing Sheets

(56) References Cited

U.S. PATENT DOCUMENTS

| | | | |
|---|---|---|---|
| 2009/0166378 A1* | 7/2009 | Stilley | B05B 1/002 222/39 |
| 2010/0208462 A1* | 8/2010 | Wu | F21V 23/00 362/253 |
| 2013/0208576 A1* | 8/2013 | Loree, IV | G04G 11/00 368/256 |
| 2013/0215611 A1* | 8/2013 | Wong | F21V 7/0083 362/243 |
| 2013/0265760 A1* | 10/2013 | Demuynck | F21K 9/23 362/240 |
| 2014/0185289 A1* | 7/2014 | Clauss | F21V 29/763 362/240 |
| 2015/0230318 A1* | 8/2015 | Go | G04G 13/02 368/10 |
| 2017/0146890 A1* | 5/2017 | Shoemake | G06F 1/1626 |
| 2017/0363276 A1* | 12/2017 | Chien | F21V 5/04 |
| 2018/0292069 A1* | 10/2018 | Callahan | F21S 8/08 |
| 2018/0334232 A1* | 11/2018 | Poole | B63B 45/04 |
| 2018/0336002 A1* | 11/2018 | Hansen | H05B 45/00 |
| 2019/0215926 A1* | 7/2019 | Lay | F21V 23/0492 |
| 2019/0282016 A1* | 9/2019 | Long | F21V 23/06 |
| 2020/0011491 A1* | 1/2020 | Cao | F21L 4/02 |
| 2020/0160798 A1* | 5/2020 | Taekema | G04G 9/0094 |

\* cited by examiner

LIGHTING APPARATUS WITH ELASTIC UNIT TO PRESS POWER SWITCH

FIELD

The present invention is related to a lighting apparatus, and more particularly related to a portable lighting apparatus with self-powered source.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Instead of light devices fixed on a ceiling or a wall, people sometimes need some portable lighting apparatuses. It is important to use such portable lighting apparatuses to handle some situations not nicely covered by normal light devices.

Unlike flashlight devices people take for camping or used when indoor power is stopped suddenly, such portable lighting apparatuses need to be used conveniently and with low cost.

Flexibility and easy to configure are also important in product design.

Therefore, it is beneficial to develop innovative lighting apparatus with convenient adjustment.

SUMMARY

In some embodiments, a lighting apparatus includes a top cover, a bottom cover, a light passing cover, a battery, a power circuit, a power switch and a light source plate.

The top cover has an opening part for defining a light opening.

The bottom cover is fixed to the top cover forming a containing space.

The light passing cover has a larger diameter than the light opening.

A peripheral edge of the light passing cover engages an inner surface of the opening part of the top cover.

The battery is stored in the container space.

The power circuit is connected to the battery for providing a current to the LED modules of the light source plate.

The power switch is connected to the power circuit to control the LED modules.

The power switch is stored in the container space.

The light source plate has a top side mounted with multiple LED modules.

The light source plate has a bottom side opposite to the top side. The bottom side is pressed by an elastic unit.

When the light passing cover is pressed toward the light source plate, the light source plate presses and deforms the elastic unit to operate the power switch.

In some embodiments, the lighting apparatus may also include a reflector cup module between the light passing cover and the light source plate.

In some embodiments, the reflector cup module has multiple reflector cups each having a cup opening exposing a sub light module of the light source plate.

In some embodiments, each sub light module has multiple types of LED modules with different optical parameters.

In some embodiments, the sub light modules are controlled separately to mix different required patterns.

In some embodiments, the different required patterns are corresponding to multiple messages to be delivered visually to a user.

In some embodiments, the lighting apparatus may also include an isolation plate.

The elastic unit has one end connected to a top surface of the isolation plate and the elastic unit has the other end connected to the light source plate.

In some embodiments, the reflector cup module is detachable to be replaced as a lens module.

In some embodiments, the power switch enables a speaker to generate a sound when the power switch is operated.

In some embodiments, the power switch enables a light pattern displayed by the LED modules.

In some embodiments, the lighting apparatus may also include a connector for connecting to another lighting apparatus of the same type.

When the power switch is operated, a corresponding message is transmitted to said another lighting apparatus to control said another lighting apparatus.

In some embodiments, a first operation of a power switch on said another lighting apparatus is counted together with a second operation of the power switch of the lighting apparatus to control the lighting apparatus and said another lighting apparatus.

In some embodiments, the power circuit shares a part of power of the battery to said another lighting apparatus.

In some embodiments, the light passing cover has a lateral wall limited to move upwardly and downwardly by a limiting structure.

In some embodiments, the limiting structure is fixed to the top cover.

In some embodiments, the top cover has a top wall and the bottom cover has a bottom wall.

The top wall and the bottom wall together form a lateral wall of the lighting apparatus.

In some embodiments, the lighting apparatus may also include a clock unit.

The LED module of the light source plate emits a wakeup light when an alarm time is time up.

The light passing cover is pressed to turn off the wakeup light.

In some embodiments, the clock unit counts down a predetermined time period when the light passing cover is pressed before turning off automatically.

In some embodiments, the power circuit converts an external power source to charge the battery.

In some embodiments, there are multiple batteries arranged in a polygonal shape surrounding the elastic unit.

DETAILED DESCRIPTION

Figure 14:
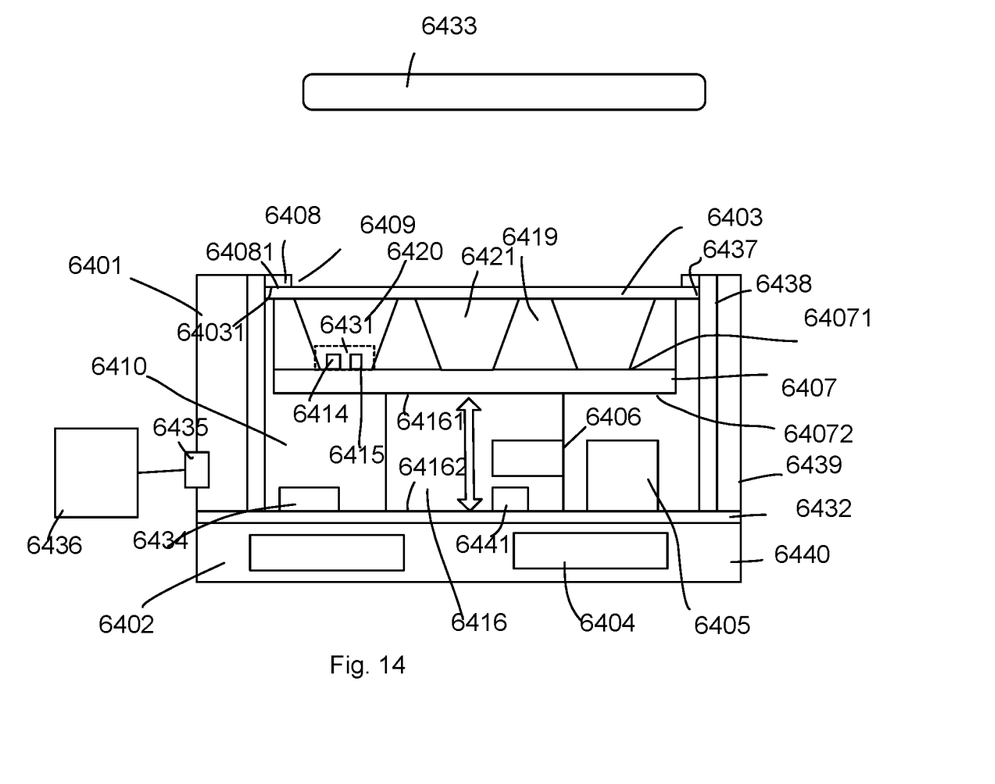
FIG. 14 illustrates components in a lighting apparatus embodiment.

In FIG. 14, a lighting apparatus includes a top cover 6401, a bottom cover 6402, a light passing cover 6403, a battery 6404, a power circuit 6405, a power switch 6406 and a light source plate 6407.

The top cover 6401 has an opening part 6408 for defining a light opening 6409.

The bottom cover 6402 is fixed to the top cover 6401 forming a containing space 6410.

The light passing cover 6403 has a larger diameter than the light opening 6409.

A peripheral edge 64031 of the light passing cover 6403 engages an inner surface 64081 of the opening part 6408 of the top cover 6401.

The battery 6404 is stored in the container space 6410.

The power circuit 6405 is connected to the battery 6404 for providing a current to the LED modules 6414, 6415 of the light source plate 6407.

The power switch 6404 is connected to the power circuit 6405 to control the LED modules 6414, 6415.

The power switch 6405 is stored in the container space 6410.

The light source plate 6407 has a top side 64071 mounted with multiple LED modules 6414, 6415.

The light source plate 6407 has a bottom side 64072 opposite to the top side 64071. The bottom side 64072 is pressed by an elastic unit 6416.

When the light passing cover 640 is pressed toward the light source plate 6407, the light source plate 6407 presses and deforms the elastic unit 6416 to operate the power switch 6406. The elastic unit 6416 may be a spring, a sponge, an elastic clip or other elastic structures.

In some embodiments, the lighting apparatus may also include a reflector cup module 6419 between the light passing cover 6403 and the light source plate 6407.

In some embodiments, the reflector cup module 6407 has multiple reflector cups 6420, 6421 each having a cup opening exposing a sub light module 6431 of the light source plate 6407.

In some embodiments, each sub light module has multiple types of LED modules with different optical parameters. For example, the LED modules 6414, 6415 emit light of different color temperatures. By supplying different ratios of currents to the LED modules 6414, 6415, a required color temperature is obtained.

In some embodiments, the sub light modules are controlled separately to mix different required patterns.

In some embodiments, the different required patterns are corresponding to multiple messages to be delivered visually to a user. For example, the power circuit 6405 includes a driver receiving a message from a smoke detector, a temperature detector, an incoming call detector and controls the LED modules to generate a corresponding light pattern, e.g. different tempos of blinking, different colors or other light patterns.

In some embodiments, the lighting apparatus may also include an isolation plate 6432.

The elastic unit 6416 has one end 64162 connected to a top surface of the isolation plate 6432 and the elastic unit 6416 has the other end 64161 connected to the light source plate 6407.

In some embodiments, the reflector cup module 6419 is detachable to be replaced as a lens module 633.

In some embodiments, the power switch 6406 enables a speaker 6434 to generate a sound when the power switch 6406 is operated.

In some embodiments, the power switch enables a light pattern displayed by the LED modules.

In some embodiments, the lighting apparatus may also include a connector 6435 for connecting to another lighting apparatus 6436 of the same type.

When the power switch 6406 is operated, a corresponding message is transmitted to said another lighting apparatus 6436 to control said another lighting apparatus 6436.

In some embodiments, a first operation of a power switch on said another lighting apparatus is counted together with a second operation of the power switch of the lighting apparatus to control the lighting apparatus and said another lighting apparatus.

For example, when light passing covers of two such lighting apparatuses are pressed at the same time, or the left one, or the right one is pressed, different control messages are generated for controlling the two lighting apparatuses.

In some embodiments, the power circuit shares a part of power of the battery to said another lighting apparatus.

In some embodiments, the light passing cover has a lateral wall 6437 limited to move upwardly and downwardly by a limiting structure 6438.

In some embodiments, the limiting structure 6438 is fixed to the top cover 6401.

In some embodiments, the top cover has a top wall 6439 and the bottom cover has a bottom wall 6440.

The top wall 6439 and the bottom wall 6440 together form a lateral wall of the lighting apparatus.

In some embodiments, the lighting apparatus may also include a clock unit 6441.

The LED module of the light source plate emits a wakeup light when an alarm time is time up.

The light passing cover is pressed to turn off the wakeup light.

In some embodiments, the clock unit 6441 counts down a predetermined time period when the light passing cover is pressed before turning off automatically.

In some embodiments, the power circuit converts an external power source to charge the battery.

Figure 6:
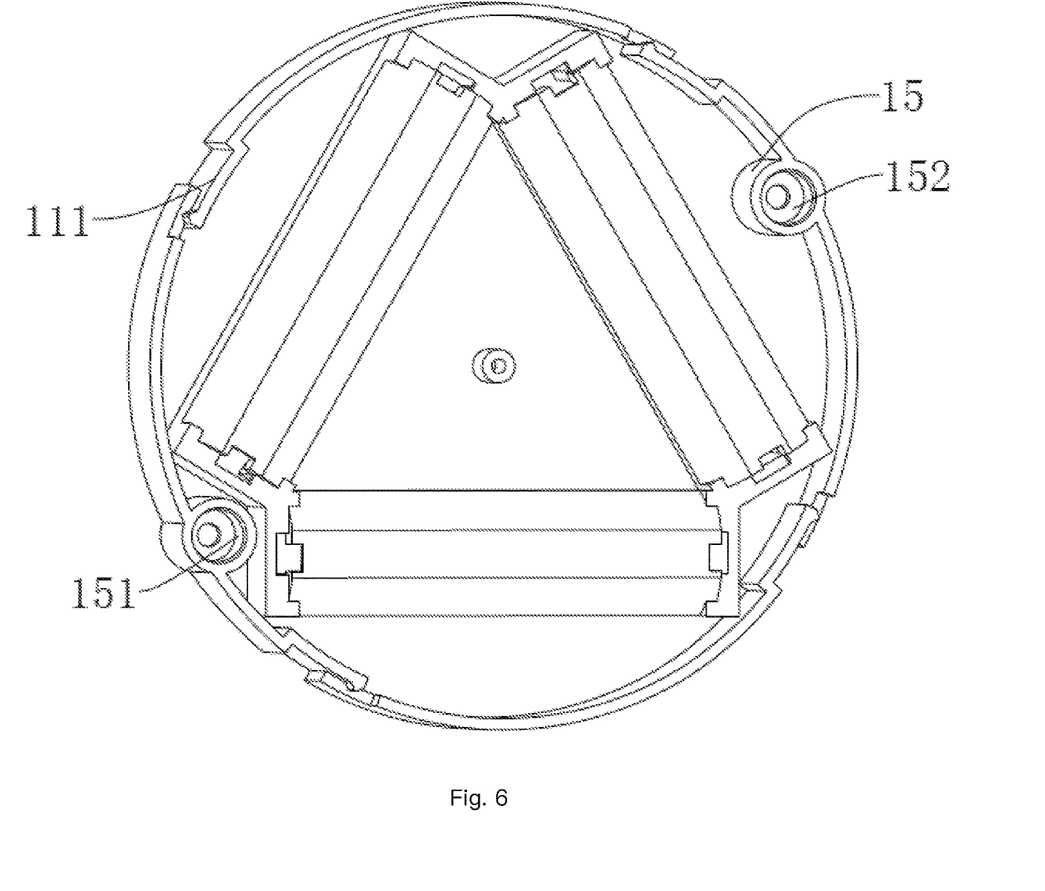
FIG. 6 illustrates an arrangement of batteries.

In some embodiments, there are multiple batteries arranged in a polygonal shape surrounding the elastic unit. For example, FIG. 6 shows three batteries arranged in a triangle shape.

Figure 1:
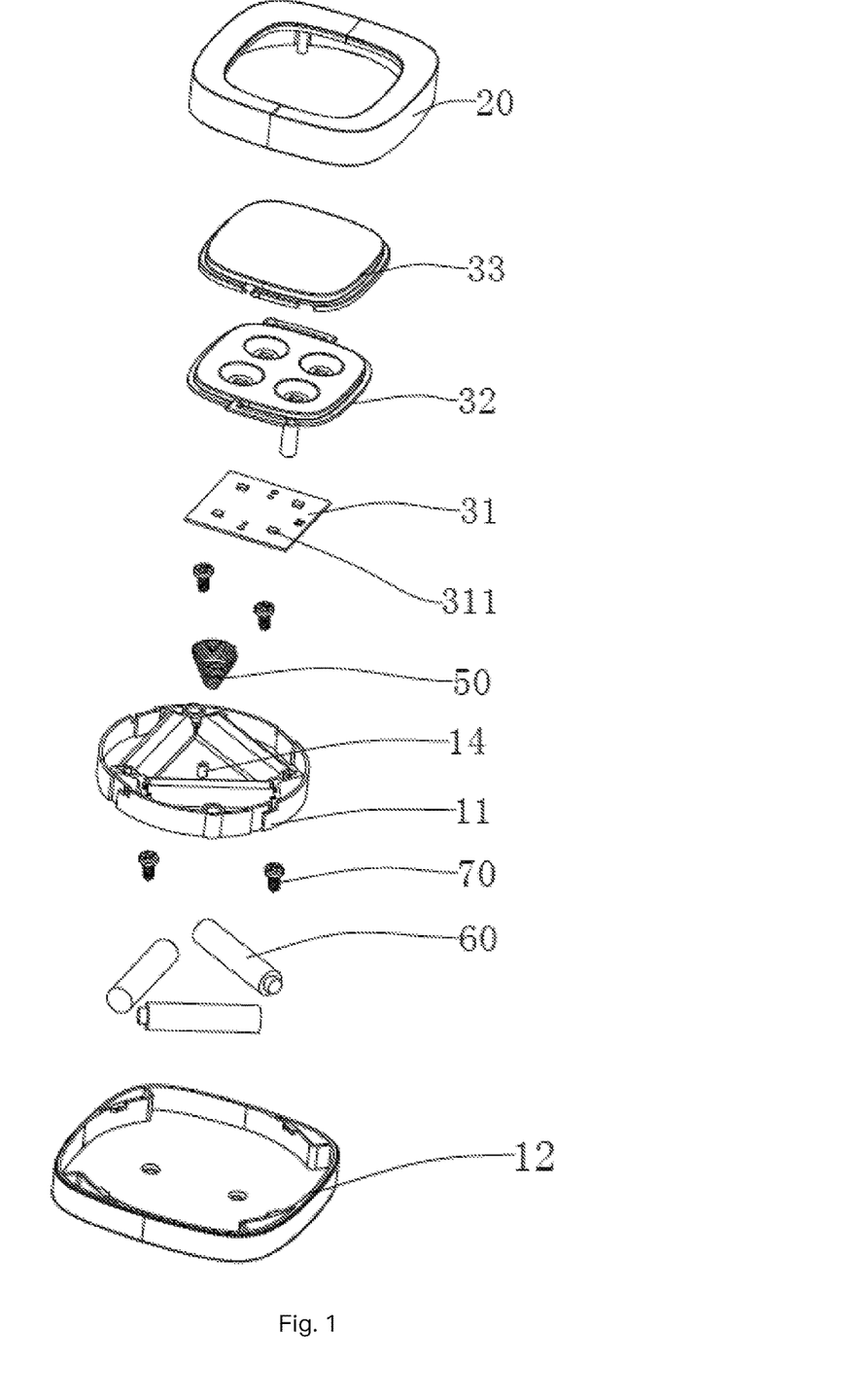
FIG. 1 illustrates an exploded view of a lighting apparatus embodiment.

Please refer to FIG. 1, which shows an exploded view of a lighting apparatus embodiment.

The lighting apparatus has a top cover 20, a light passing cover 33, a reflector cup module 32 having four reflector cups, a light source plate 31 mounted with multiple LED modules 311, an elastic unit 50, a power switch 14, connectors 70, batteries 60 and a bottom cover 12.

The elastic unit 50 is a spring with a broader diameter at its top against the light source plate and a narrower diameter at another side facing to the bottom cover 12.

Figure 2:
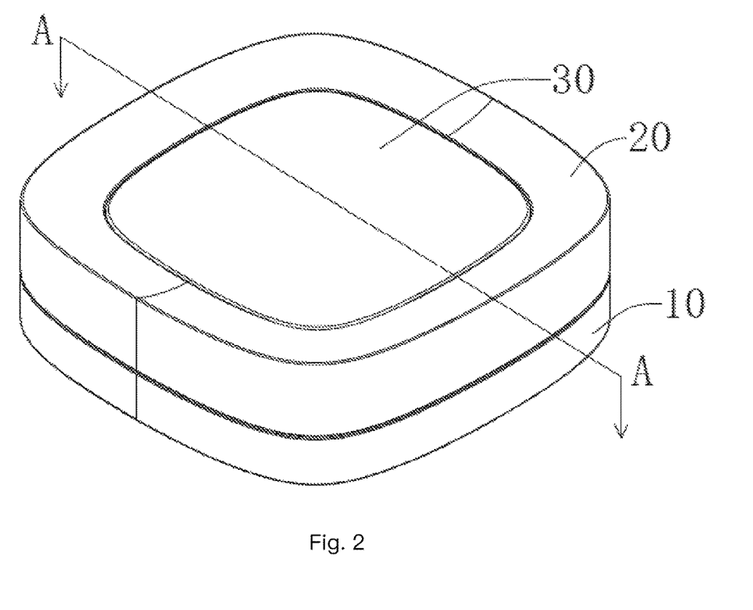
FIG. 2 illustrates another view of the lighting apparatus embodiment in FIG. 1.

Please refer to FIG. 2. FIG. 2 shows a lighting apparatus 30 having a top cover 20 and a bottom cover 10.

Figure 3:
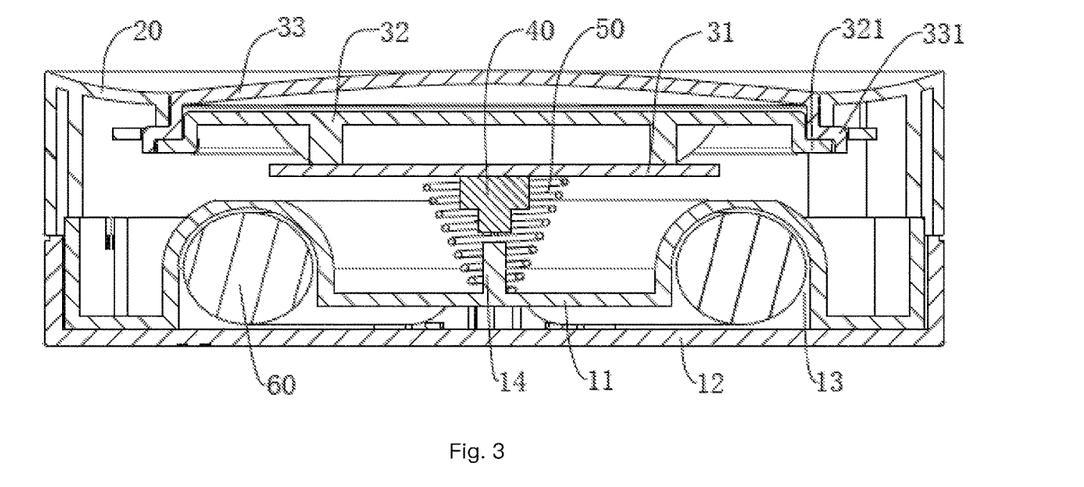
FIG. 3 illustrates a cross sectional view of the embodiment in FIG. 1.

FIG. 3 shows a cross-sectional view of the lighting apparatus example. Reference numerals of the same numbers refer to the same components and are not repeated again for brevity.

In FIG. 3, the light source plate 31 engages the reflector cup module 32, which further engages the light passing cover 33. When users press the light passing cover 33, the light passing cover 33 presses the reflector cup module 32. Meanwhile, the reflector cup module 32 presses the light source plate 31. The light source plate 31 presses the elastic unit 50 to deform to trigger the power switch 14. There is a first ring structure 321 and a second ring structure 331. The batteries 60 are stored in the container space 13, concealed by the isolation plate 11 and the bottom plate 12. The top cover 20 is fixed to the bottom cover 12.

Figure 4:
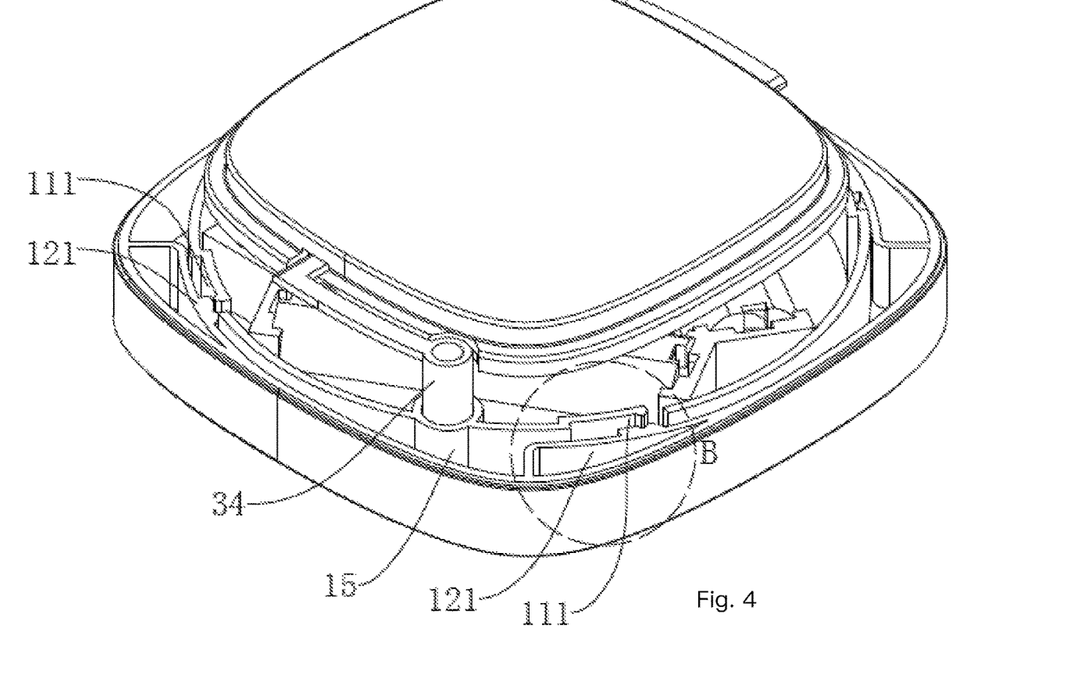
FIG. 4 illustrates a portion of components in the embodiment.

FIG. 4 shows two buckle structures 121, 111. A limiting structure 34 is moved along the first connector part 15 for providing the light passing cover to move vertically to press the elastic unit.

Figure 5:
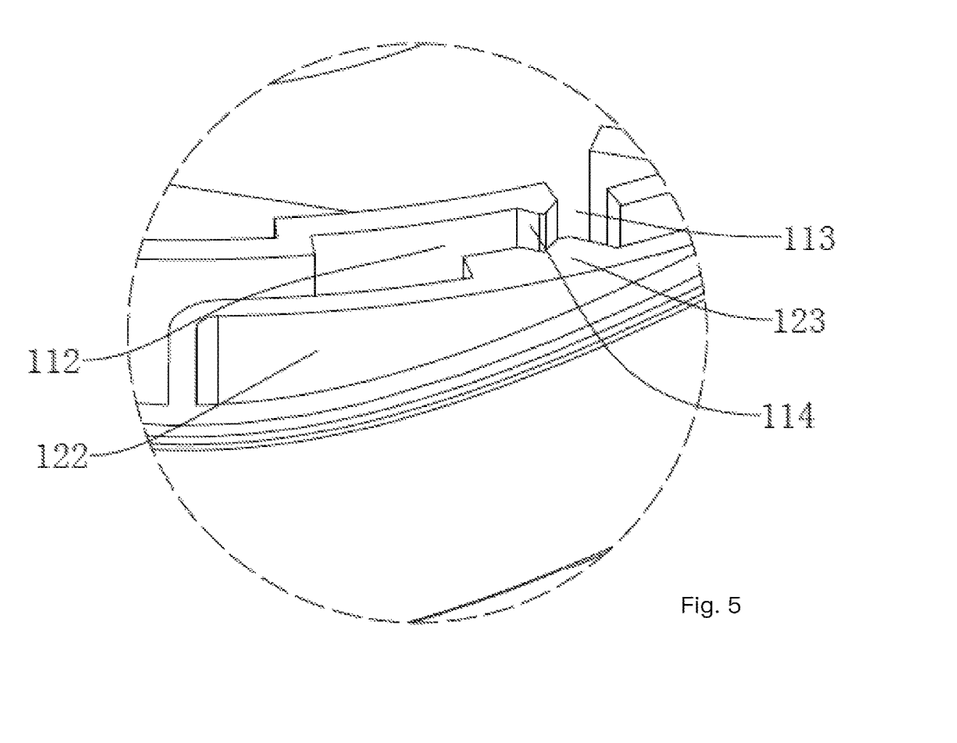
FIG. 5 illustrates a component example.

FIG. 5 shows a zoom-up view of components. In FIG. 5, a peripheral opening 113 is defined by the second buckle block 123 and the first buckle block 114. There is a guiding groove 112 and there is a bending plate 122 for connecting components.

FIG. 6 shows a first connector part 15 having a block plate 152 and a first installation hole 151. The first buckle structure 111 is used for forming the wall for containing the batteries.

Figure 7:
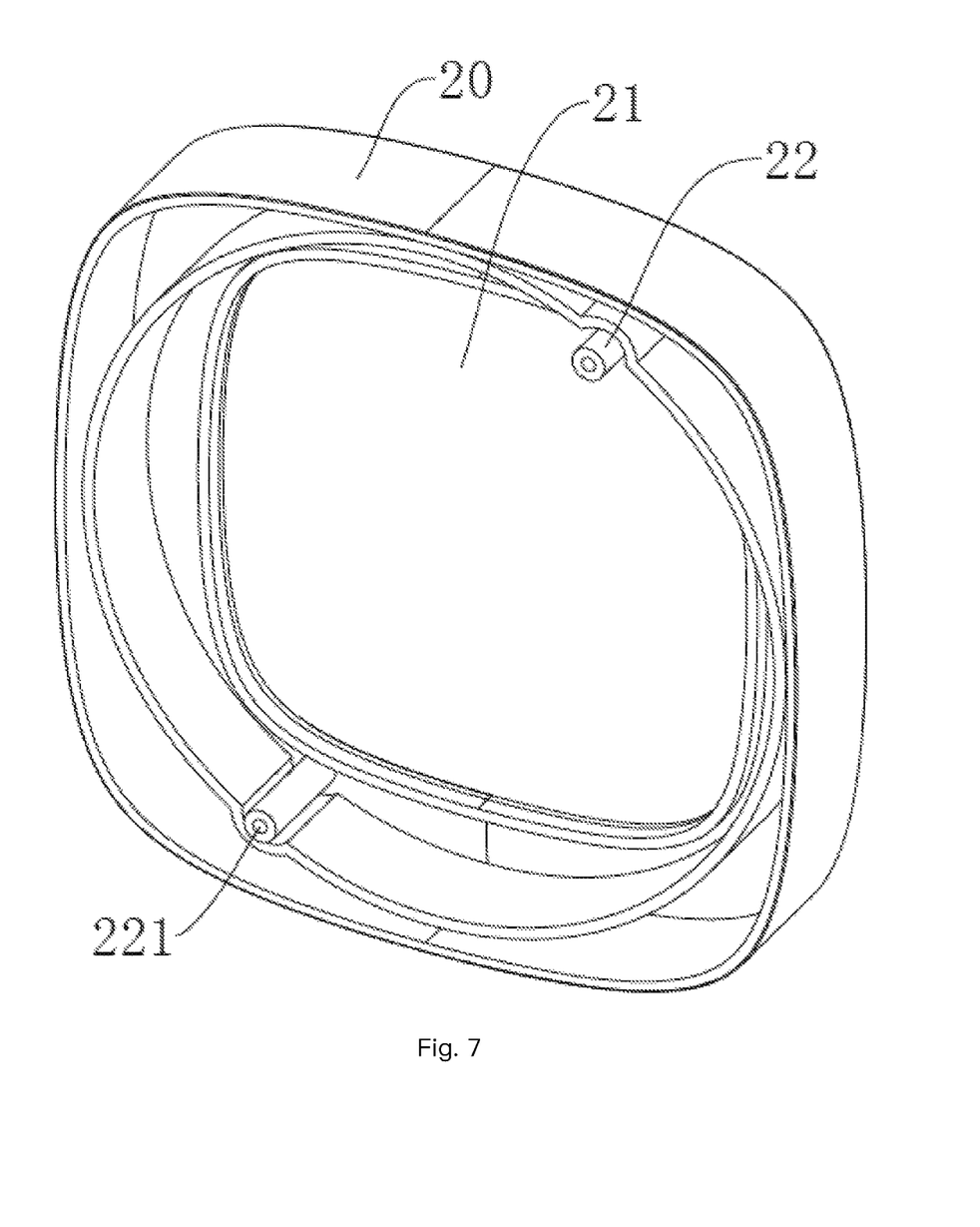
FIG. 7 illustrates a top cover and a limiting structure for limiting movement of the light passing cover.

FIG. 7 shows a pressing opening 21, a second connector part 22 in a top cover 20. There is a second installation hole 221 to fix to the bottom cover.

Figure 8:
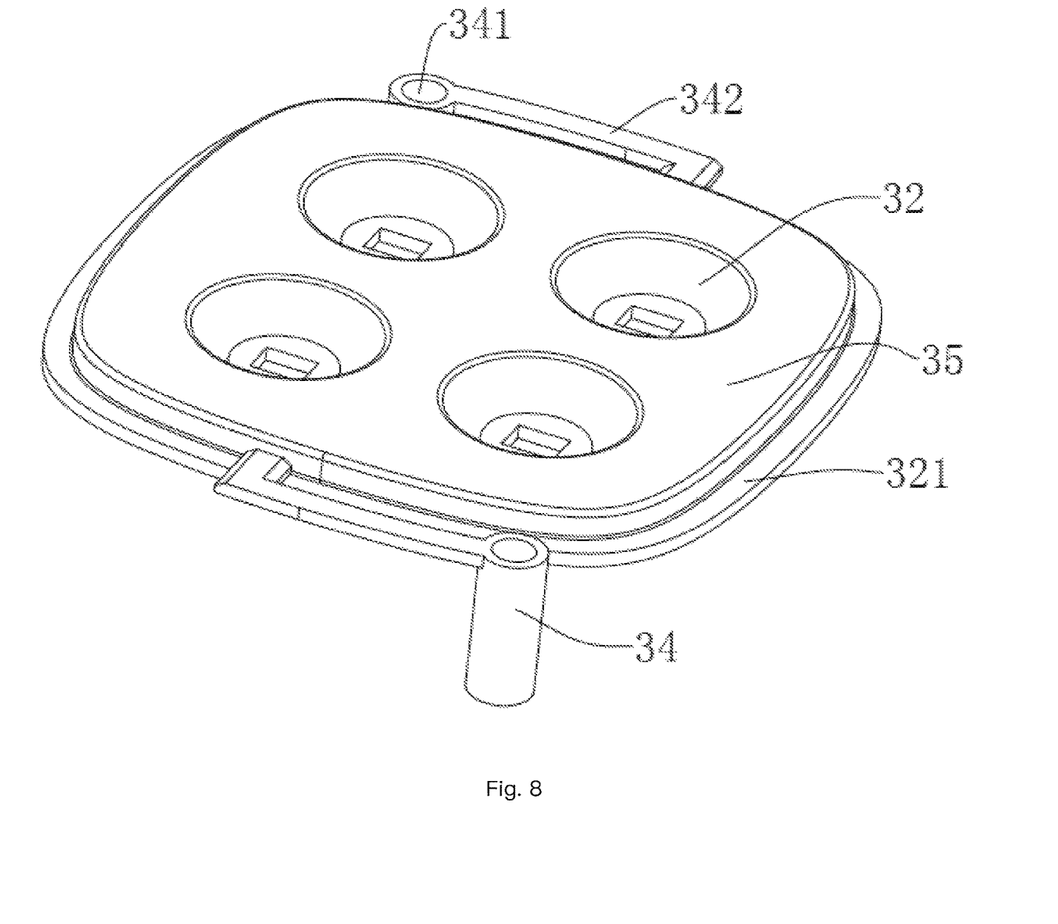
FIG. 8 illustrates a reflector cup module with multiple reflector cups.

FIG. 8 shows a reflector cup module 32. The reflector cup module 32 has a through hole 341 and a connector plate 342, a limit structure 34 to keep the reflector cup module 32 to move vertically pressing the elastic unit mentioned above. There is a first ring structure 321 with a lower height than the fixing plate 35.

Figure 9:
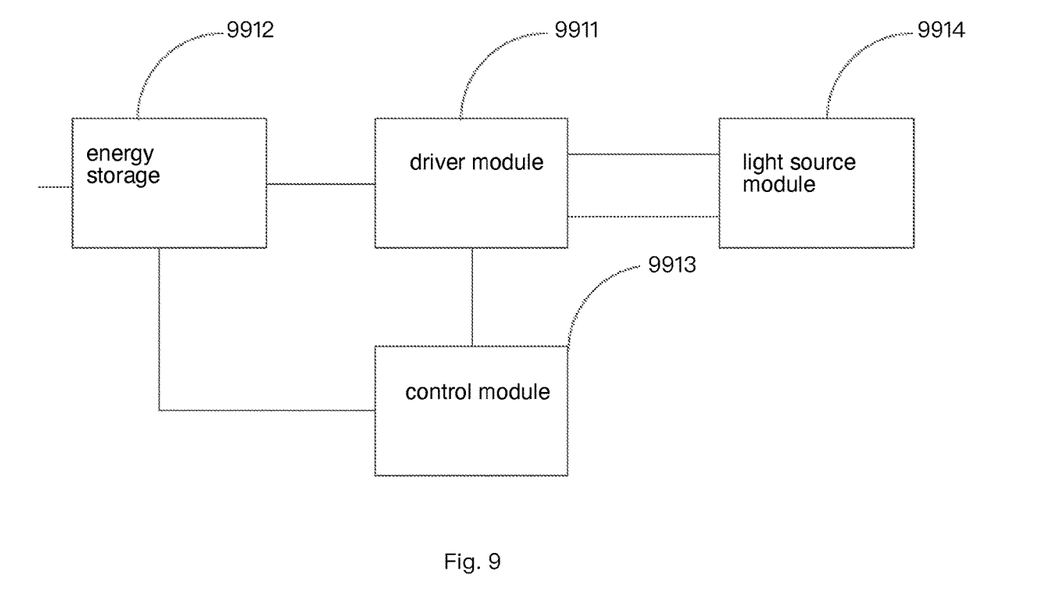
FIG. 9 illustrates a circuit diagram of an embodiment.

FIG. 9 shows a circuit diagram with an energy storage 9912, a driver module 9911, a control module 9913 and a light source module 9914.

The energy storage 9912 may be a battery. The driver module 9911 may include driver circuits for converting the battery power or an external power to a driving current to the light source module 9911, e.g. the light source plate mounted with LED modules mentioned above.

The control module 9913 may detect the power switch mentioned above to generate a control signal to the driver module 9911.

Figure 10:
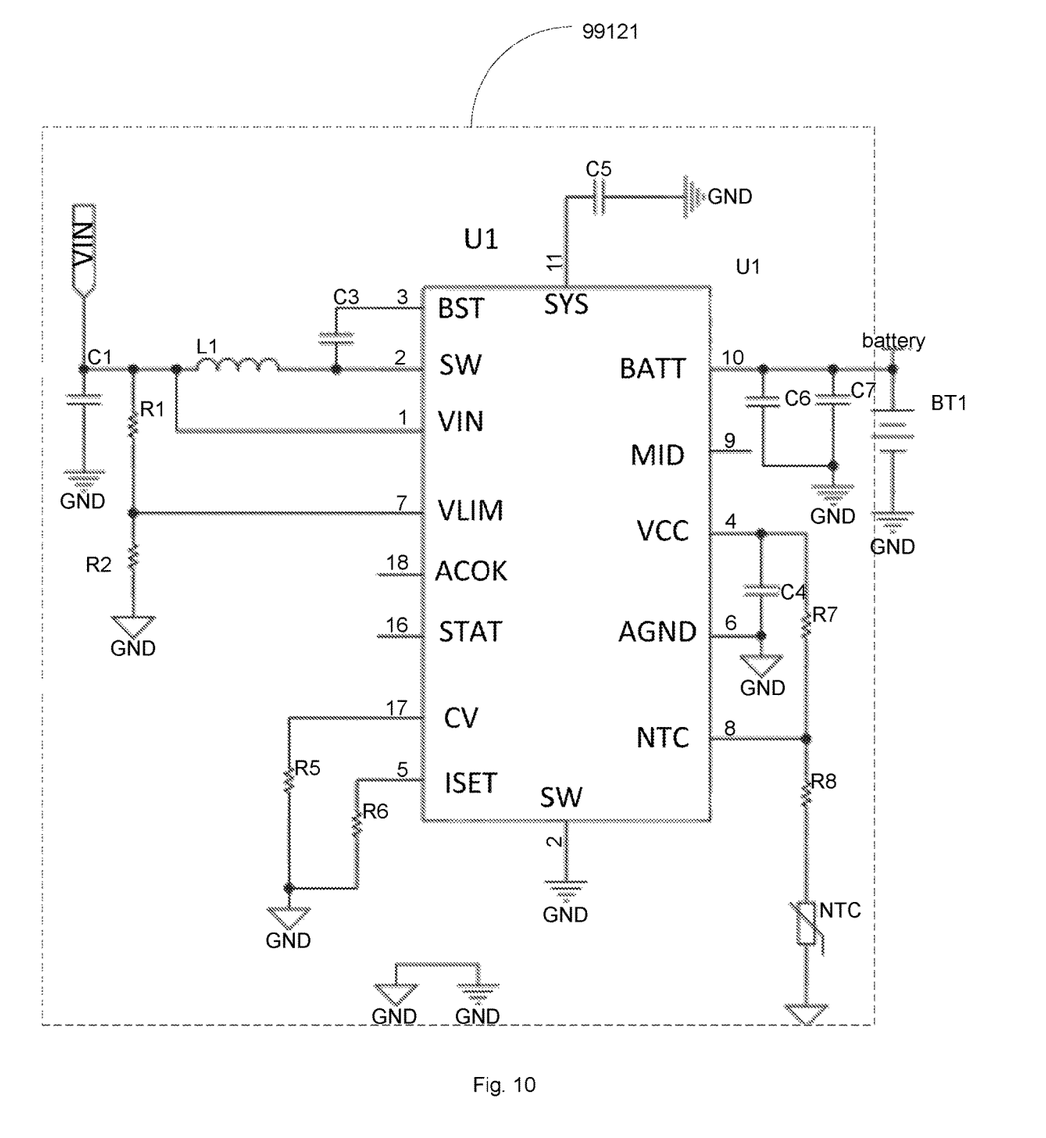
FIG. 10 illustrates a charging control unit.

FIG. 10 shows a circuit diagram of a power chip connected with capacitors, resistors and other components that may be used as a charging control unit 99121 for charging the battery mentioned above.

Figure 11:
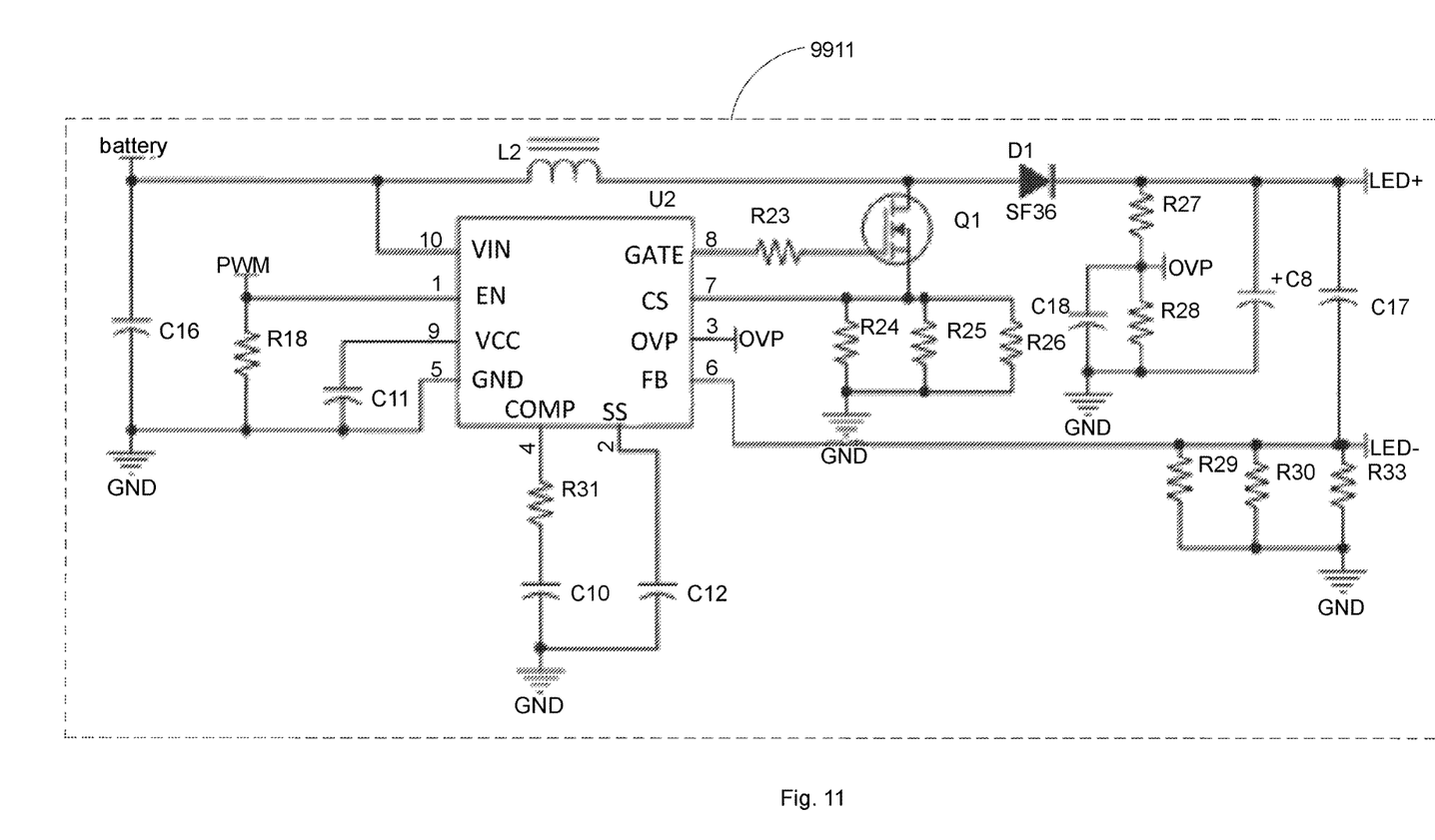
FIG. 11 illustrates a driver module circuit diagram.

FIG. 11 shows a driver module 9911 with components for generating driving currents to the LED modules.

Figure 12:
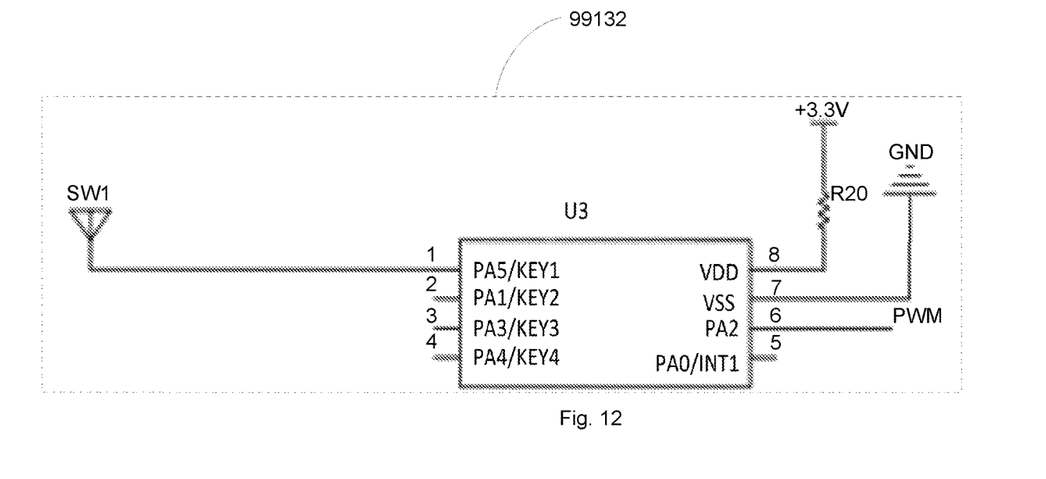
FIG. 12 illustrates a control unit circuit diagram.

FIG. 12 shows a control module 99132 that may receive a wireless signal to control the LED modules and the driver module.

Figure 13:
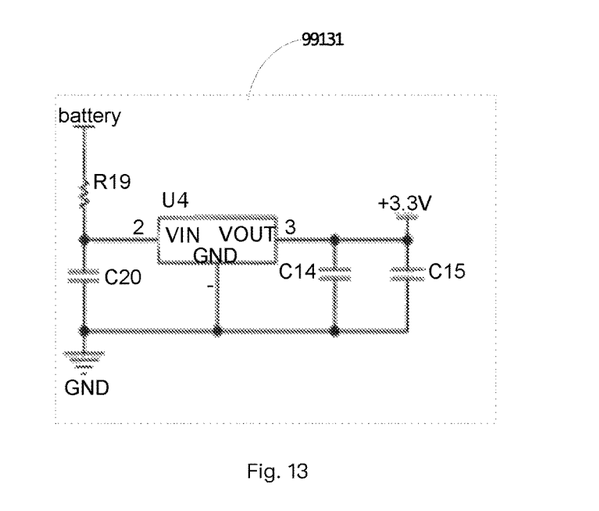
FIG. 13 illustrates a power unit circuit diagram.

FIG. 13 shows a power unit 99131 for generating a driving current.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
   a top cover having an opening part for defining a light opening;
   a bottom cover, fixed to the top cover forming a containing space;
   a light passing cover having a larger diameter than the light opening, wherein a peripheral edge of the light passing cover engages an inner surface of the opening part of the top cover;
   a battery stored in the container space;
   a power circuit connected to the battery for providing a current to the LED modules of the light source plate;
   a power switch connected to the power circuit to control the LED modules, wherein the power switch is stored in the container space;
   a light source plate with a top side mounted with multiple LED modules, wherein the light source plate has a bottom side opposite to the top side, the bottom side is pressed by an elastic unit, when the light passing cover is pressed toward the light source plate, the light source plate presses and deforms the elastic unit to operate the power switch; and
   a clock unit, wherein the LED module of the light source plate emits a wakeup light when an alarm time is time up, wherein the light passing cover is pressed to turn off the wakeup light, wherein when the light passing cover is pressed, the clock unit waits by counting down a predetermined time period before turning off the wakeup light.

2. The lighting apparatus of claim 1, further comprising a reflector cup module between the light passing cover and the light source plate.

3. The lighting apparatus of claim 2, wherein the reflector cup module has multiple reflector cups each having a cup opening exposing a sub light module of the light source plate.

4. The lighting apparatus of claim 3, wherein each sub light module has multiple types of LED modules with different optical parameters.

5. The lighting apparatus of claim 3, wherein the sub light modules are controlled separately to mix different required patterns.

6. The lighting apparatus of claim 5, wherein the different required patterns are corresponding to multiple messages to be delivered visually to a user.

7. The lighting apparatus of claim 1, further comprising an isolation plate, wherein the elastic unit has one end connected to a top surface of the isolation plate and the elastic unit has the other end connected to the light source plate.

8. The lighting apparatus of claim 1, wherein the power switch enables a speaker to generate a sound when the power switch is operated.

9. The lighting apparatus of claim 1, wherein the power switch enables a light pattern displayed by the LED modules.

10. The lighting apparatus of claim 1, further comprising a connector, wherein the connector is used for connecting to another lighting apparatus of the same type, when the power switch is operated, a corresponding message is transmitted to said another lighting apparatus to control said another lighting apparatus via the connector.

11. The lighting apparatus of claim 10, wherein the power circuit shares a part of power of the battery to said another lighting apparatus.

12. The lighting apparatus of claim 1, wherein the light passing cover has a lateral wall limited to move upwardly and downwardly by a limiting structure.

13. The lighting apparatus of claim 12, wherein the limiting structure is fixed to the top cover.

14. The lighting apparatus of claim 1, wherein the top cover has a top wall and the bottom cover has a bottom wall, the top wall and the bottom wall together form a lateral wall of the lighting apparatus.

15. The lighting apparatus of claim 1, wherein the power circuit converts an external power source to charge the battery.

16. The lighting apparatus of claim 1, wherein there are multiple batteries arranged in a polygonal shape surrounding the elastic unit.

* * * * *